(12) United States Patent
von Flotow et al.

(10) Patent No.: US 10,844,839 B2
(45) Date of Patent: Nov. 24, 2020

(54) WIND HARVESTING SYSTEMS AND METHODS

(71) Applicant: Hood Technology Corporation, Hood River, OR (US)

(72) Inventors: Andreas H. von Flotow, Hood River, OR (US); Corydon C. Roeseler, Hood River, OR (US)

(73) Assignee: Hood Technology Corporation, Hood River, OR (US)

( * ) Notice: Subject to any disclaimer, the term of this patent is extended or adjusted under 35 U.S.C. 154(b) by 0 days.

(21) Appl. No.: 16/275,820

(22) Filed: Feb. 14, 2019

(65) Prior Publication Data

US 2019/0285055 A1    Sep. 19, 2019

Related U.S. Application Data

(60) Provisional application No. 62/644,840, filed on Mar. 19, 2018.

(51) Int. Cl.
| | |
|---|---|
| *B64C 31/06* | (2020.01) |
| *B64C 39/02* | (2006.01) |
| *B64F 3/00* | (2006.01) |
| *F03D 9/32* | (2016.01) |
| *H02K 7/18* | (2006.01) |
| *F03D 9/25* | (2016.01) |
| *F03D 5/00* | (2006.01) |
| *F03D 9/11* | (2016.01) |
| *F03D 1/00* | (2006.01) |

(52) U.S. Cl.
CPC ............... *F03D 9/32* (2016.05); *B64C 31/06* (2013.01); *B64C 39/022* (2013.01); *B64F 3/00* (2013.01); *F03D 5/00* (2013.01); *F03D 9/257* (2017.02); *H02K 7/183* (2013.01); *F03D 1/00* (2013.01); *F03D 9/11* (2016.05); *F05B 2240/921* (2013.01)

(58) Field of Classification Search
CPC ... F03D 9/32; F03D 9/257; F03D 5/00; F03D 1/00; B64C 31/06; B64C 39/022; B64F 3/00; H02K 7/183; F05B 2240/921
See application file for complete search history.

(56) References Cited

U.S. PATENT DOCUMENTS

| | | | |
|---|---|---|---|
| 3,998,408 A | * | 12/1976 | Caldwell, Jr. .......... B63B 22/003 244/138 R |
| 4,251,040 A | | 2/1981 | Loyd |
| 6,072,245 A | | 6/2000 | Ockels |
| 7,504,741 B2 | | 3/2009 | Wrage et al. |
| 7,672,761 B2 | | 3/2010 | Wrage et al. |
| 7,830,033 B2 | | 11/2010 | Meller |

(Continued)

OTHER PUBLICATIONS

Miles L. Loyd, "Crosswind Kite Power" J. Energy vol. 4, No. 3, pp. 106-111, May-Jun. 1980 (6 pages).

(Continued)

*Primary Examiner* — Tulsidas C Patel
*Assistant Examiner* — Joseph Ortega
(74) *Attorney, Agent, or Firm* — Neal, Gerber & Eisenberg LLP (57) ABSTRACT

Various embodiments of the present disclosure provide wind harvesting systems and methods using crosswind power kites and methods for launching crosswind power kites into wing-borne flight, for generating electricity through such flights, and for landing or retrieving such crosswind power kites.

20 Claims, 7 Drawing Sheets

(56) References Cited

U.S. PATENT DOCUMENTS

| | | |
|---|---|---|
| 7,971,545 B2 | 7/2011 | Wrage |
| 8,056,490 B2 | 11/2011 | Wrage |
| 8,247,912 B2 | 8/2012 | Da Costa Duarte Pardal et al. |
| 9,698,642 B1 | 7/2017 | Goessling et al. |
| 9,732,731 B2 | 8/2017 | Hachtmann et al. |
| 2010/0032948 A1 | 2/2010 | Bevirt |
| 2010/0133385 A1 | 6/2010 | Olson |
| 2010/0221112 A1 | 9/2010 | Bevirt et al. |
| 2010/0295303 A1 | 11/2010 | Lind et al. |
| 2011/0260462 A1 | 10/2011 | Vander Lind |
| 2011/0266809 A1* | 11/2011 | Calverley ................. F03D 5/00 290/55 |
| 2012/0104763 A1 | 5/2012 | Lind |
| 2013/0221154 A1 | 8/2013 | Vander Lind et al. |
| 2013/0221679 A1 | 8/2013 | Vander Lind |
| 2016/0264260 A1 | 9/2016 | Hachtmann et al. |
| 2017/0363068 A1* | 12/2017 | Hart ........................ F03D 13/20 |
| 2017/0363069 A1* | 12/2017 | Hart ........................ F03D 5/00 |
| 2017/0363070 A1* | 12/2017 | Hart ........................ F03D 13/25 |

OTHER PUBLICATIONS

European Patent Office, "Extended European Search Report", From corresponding European Patent Application No. 19163379.1—1007 (7 pages), dated Aug. 19, 2019.

\* cited by examiner

WIND HARVESTING SYSTEMS AND METHODS

PRIORITY

This application claims priority to and the benefit of U.S. Provisional Patent Application No. 62/644,840, filed Mar. 19, 2018, the entire contents of which are incorporated herein by reference.

FIELD

The present disclosure generally relates to wind harvesting systems and methods including crosswind power kites and methods for launching crosswind power kites into wing-borne flight, for generating electricity through such flights, and for landing such crosswind power kites.

BACKGROUND

Miles Loyd in 1980 published an analysis of electrical power that can be generated from a kite flying in wind, constrained by a tether. Loyd's analysis quantified the benefits of using a low-drag/high-lift kite configuration, and computed an example that assumed the kite was aerodynamically and structurally similar to the airframe of a 170 ton C-5 aircraft.

Since 1980, various crosswind power kite systems have been proposed, built, tested, or flown in attempts to implement the basic ideas in Loyd's publication.

To date, all such known crosswind power kite systems have implemented impractical launching and/or landing methods for such crosswind power kites. These impractical methods have imposed significant configuration penalties upon the kite, the ground support hardware, or both.

For example, certain known crosswind power kite systems include relatively small crosswind power kites and provide: (1) hand-thrown launching of the kite; and (2) landing of the kite while dragging the tether. Such small crosswind power kites are launched by muscle-propelled throwing. This approach limits the size and weight of the crosswind power kite and requires a geographic area suitable to accommodate the kite's tether.

In other examples, certain known crosswind power kite systems provide: (1) hand launching of fabric kites; and (2) landing of the fabric kites by various soft-crash methods. Such fabric kites have been operated by such methods in wind sports. More specifically, with the fabric kite's tether taught, the fabric kite is hand-held such that the wind partly inflates the kite's fabric shape. The fabric kite is then released as the wind fully-inflates the kite's fabric shape, and the fabric kite rises into flight. Landing of such fabric kites is accomplished by "crash," usually leaving the fabric kite undamaged. These methods require an obstacle-free geographic area comparable in size to at least the tether length. These launching and landing methods are limited to relatively small-size kites.

In other examples, certain known crosswind power kite systems provide: (1) hover launching of the kites; and (2) hover landing of the kites. Certain of these kites carry electric motors capable of powering kite-mounted propellers. These motor/rotor assemblies (which may each include one or more rotors or propellers) can be sized powerful enough to maintain the kite in hover, while also managing the tether. During power-generating wing-borne flight, these same motor/rotor assemblies are used to generate electrical power. The kite tether in these systems includes electrical conductors configured to deliver electrical power either from the ground to the kite, or from the kite to the ground. This approach suffers from configuration penalties associated with sizing the motor/rotor assemblies and the tether both large enough to sustain hovering flight. Further, the wing/airframe of these types of kites must be configured for both hovering and wing-borne flight. The associated configuration compromises are thus severe in these known systems.

In other examples, certain known crosswind power kite systems provide: (1) tow/catapult launching of the kite with a connected tether; and (2) landing of the kite, with a connected tether, on a dedicated runway. Such systems can be viewed as up-sizing and mechanizing the hand-thrown launching system described above in the first example. For launching, this system requires coordination between a launch catapult, a powered tether winch, and the kite's autopilot. For landing, this system requires coordination between a powered tether winch, the kite's autopilot, and a ground-based runway-hosted deceleration device. To make the hardware compact, the shortest-practical runway, catapult and deceleration devices are used, each such assembly being dedicated to one kite. This approach is both too expensive and too complex.

SUMMARY

The present disclosure relates to wind harvesting systems and method and describes crosswind power kite systems for launching, operating, and landing crosswind power kites that are configured to generate or harvest electrical power from wind. The present disclosure uses a shared runway to launch and recover these crosswind power kites. The shared runway is long enough to enable the kite launches and recoveries such that such launches and recoveries closely resemble the launches and landings of conventional aircraft, and such that the shared runway is geographically separate from the electric power generation location of each of the crosswind power kite's tether while the kite is harvesting electric power from the wind.

BRIEF DESCRIPTION OF THE FIGURES

FIG. 1 further illustrates one of the vehicles tow-launching one of the crosswind power kites in accordance with one example method of the present disclosure.

DETAILED DESCRIPTION

While the features, methods, devices, and systems described herein may be embodied in various forms, there are shown in the drawings, and will hereinafter be described, some exemplary and non-limiting embodiments. Not all of the depicted components described in this disclosure may be required, however, and some implementations may include additional, different, or fewer components from those expressly described in this disclosure. Variations in the arrangement and type of the components; the shapes, sizes, and materials of the components; and the manners of attachment and connections of the components may be made without departing from the spirit or scope of the claims as set forth herein. This specification is intended to be taken as a whole and interpreted in accordance with the principles of the disclosure as taught herein and understood by one of ordinary skill in the art. The drawings are not to scale unless noted otherwise.

The present disclosure relates to various wind harvesting systems and methods that include crosswind power kite systems for launching, operating, and landing crosswind power kites that are configured to generate or harvest electrical power from wind. The crosswind power kite system of various embodiments of the present disclosure include launch, operation, and retrieval systems (that may sometimes be called the "launch system(s)", the "operation system(s)", and the "retrieval system(s)" for brevity herein). Various example embodiments of the crosswind power kite system of present disclosure generally include: (1) a plurality or fleet of crosswind power kites; (2) a shared electric power generation site including a plurality of ground anchor assemblies; (3) a plurality of tethers; (4) a plurality of tether-to-ground-anchor attachment assemblies; (5) a plurality of tether-to-kite attachment assemblies; (6) a shared runway; (7) one or more shared powered surface launch and transport vehicles; (8) one or more shared payout winches; and (9) a shared power transmission system.

More specifically, one example embodiment of the crosswind power kite system of present disclosure is illustrated in FIGS. 1, 2A, 3, 4, and 5. This illustrated example crosswind power kite system 10 of the present disclosure includes: (1) a plurality or fleet of crosswind power kites such as crosswind power kites 12, 14, 16, 18, and 20 that are operable in a shared geographical area with a crosswind 111; (2) a shared electric power generation site including a plurality of ground anchor assemblies such as ground anchor assemblies 32, 34, 36, 38, and 40; (3) a plurality of tethers such as tethers 52, 54, 56, 58, and 60; (4) a plurality of tether-to-ground-anchor attachment assemblies (not shown); (5) a plurality of tether-to-kite attachment/release assemblies that may include tether locator balloon 82; (6) a fleet-shared runway such as fleet-shared runway 100; (7) a shared powered surface launch and transport vehicle such as launch and transport vehicle 200; (8) (optionally) a shared payout winch such as payout winch 300; and (9) a shared power transmission system such as power transmission system 500.

In this illustrated example embodiment, the fleet of crosswind power kites includes the same quantity of crosswind power kites as the quantity of ground anchor assemblies. The fleet of crosswind power kites may include any suitable quantity of crosswind power kites that are operable in a shared geographical area. In certain such embodiments, the quantity of crosswind power kites is more than the quantity of ground anchor assemblies to facilitate rotation of crosswind power kites into and out of service for maintenance of the crosswind power kites and for other purposes. In this illustrated example embodiment, each of the crosswind power kites 12, 14, 16, 18, and 20 includes, among other components: (1) a fuselage; (2) fixed wings suitably attached to and extending from the fuselage and configured to facilitate wing-borne flight of the crosswind power kite; (3) an onboard motor/rotor assembly (not labeled) suitably attached to the front of the fuselage and configured to facilitate wing-borne flight of the crosswind power kite; and (4) one or more tether connectors.

It should be appreciated that the configuration and components of the crosswind power kites may vary in accordance with the present disclosure. For example, the crosswind power kite may include a plurality of onboard motor/rotor assemblies suitably attached to the fuselage and/or the wings and configured to facilitate wing-borne flight of the crosswind power kite. In various embodiments, the onboard motor/rotor assemblies are configured to propel the crosswind power kite for: (i) launch, (ii) transition to and from a power generating orbit, and (iii) when a wind lull occurs.

In certain such embodiments, the one or more onboard motor/rotor assemblies at least partly function as the turbines for generating electric power and are thus also configured to generate electric power from the wing-borne flight of the crosswind power kite when wind conditions are favorable for harvesting wind energy. In various other embodiments of the present disclosure, one or more of the crosswind power kites includes one or more turbines for generating electric power other than the motor/rotor assemblies. In various such embodiments of the present disclosure, each of the crosswind power kites includes one or more turbines for generating electric power that is transmitted by the respective tether to the respective ground anchor assembly.

In various other embodiments of the present disclosure, each crosswind power kite provides a pulling force on its associated tether which in turn provides a pulling force on an electric power generator of the ground anchor assembly to produce electric power. In certain such embodiments of the present disclosure, each crosswind power kite does not use any thrust-producing motor/rotor assembly or turbines while harvesting electric power from the wind.

Thus, using the terminology of Miles Loyd in his 1980 publication, it should be appreciated that the crosswind power kites can be lift power kites or drag power kites in accordance with the present disclosure.

In the illustrated example embodiment of FIGS. 1, 2A, 3, 4, and 5, the quantity of ground anchor assemblies is the same as the quantity of crosswind power kites. In other embodiments, the quantity of ground anchor assemblies may be more or less than the quantity of crosswind power kites. It should be appreciated that the plurality of ground anchor assemblies are suitably spaced apart from each other at the shared power generation site to facilitate tethered flight of each of the crosswind power kites under various different wind conditions and directions without interference or chance of collision with any of the other crosswind power kites. In this illustrated example embodiment, each of the ground anchor assemblies 32, 34, 36, 38 and 40 includes: (1) a winch secured to the ground; (2) an electric power receiver (not shown) configured to receive electric power generated by the crosswind power kite that is attached to the ground anchor assembly; and (3) an electric power transmitter (not shown) configured to send or transmit the received electric power to the shared power transmission system 500.

In the alternative embodiments where the crosswind power kite provides a pulling force on its tether which in turn provides a pulling force on the ground anchor assembly to produce electric power, the ground anchor assembly for that crosswind power kite includes a winch assembly capable of servicing such a lift kite and capable of extracting electric power from the sequence of lengthening and shortening the tether.

In the illustrated example embodiment of FIGS. 1, 2A, 3, 4, and 5, the quantity of tethers is the same as the quantity of crosswind power kites. In other example embodiments, any suitable quantity of tethers may be provided. In certain such embodiments, the quantity of tethers is more than the quantity of crosswind power kites to facilitate rotation of tethers into and out of service for maintenance of or replacement of the tethers. In this illustrated example embodiment, each of the tethers 52, 54, 56, 58, and 60 includes an elongated member 312 having two opposing ends, and specifically a first or lower end configured to be releasably attached to one of the ground anchor assemblies and a second or upper end configured to be releasably attached to one of the crosswind power kites. The lower end is also releasably attached to the launch and transport vehicle 200 during launch on the runway, and during the transfer from runway to the tethered ground anchor assembly location. In this illustrated example embodiment, each of the tethers 52, 54, 56, 58, and 60 includes both: (1) a mechanical line configured for providing a mechanical connection of the respective crosswind power kite to the respective ground anchor assembly; and (2) an electric power communication line configured for providing electric power transmission from the respective crosswind power kite to the respective ground anchor assembly. The electrical connection may also transmit electrical power from the ground to the crosswind power kite and transmit data in both directions.

In the alternative embodiments where the crosswind power kite provides a pulling force on its tether which in turn provides a pulling force on the ground anchor assembly to produce electric power, the tether for that crosswind power kite does not need to include the electric power transmission line. In various such embodiments, the tether need not include electrical conductors or electrical connectors, if data is not sent via the tether.

In the illustrated example embodiment of FIGS. 1, 2A, 3, 4, and 5, the quantity of tether-to-ground-anchor attachment assemblies (not shown) is the same as quantity of tethers and the quantity of crosswind power kites. In other example embodiments, any suitable quantity of tether-to-ground-anchor attachment assemblies may be provided. In certain such embodiments, the quantity of tether-to-ground-anchor attachment assemblies is more than the quantity of crosswind power kites to facilitate rotation of the tether-to-ground-anchor attachment assemblies into and out of service for maintenance of or replacement of the tether-to-ground-anchor attachment assemblies. Each of the plurality of tether-to-ground-anchor attachment assemblies: (1) includes a mechanical connector configured for providing a releasable mechanical connection of the lower end of the respective tether to the respective ground anchor assembly; (2) may include an electric power communication line connector configured for providing a releasable electric power connection from the lower end of the respective tether to the respective ground anchor assembly and (3) may include data connections for transmitting data to and from the crosswind power kite via the tether.

It should be appreciated from the above that the present disclosure contemplates that the quantity of and combinations of the crosswind power kites, tethers, ground anchor assemblies, tether-to-ground-anchor attachment assemblies, and tether-to-kite attachment assemblies may vary.

In the illustrated example embodiment of FIGS. 1, 2A, 3, 4, and 5, the fleet of crosswind power kites share the fleet-shared runway 100. In this illustrated example embodiment, the runway includes an upper surface 103 that is long enough for: (1) the launch and transport vehicle 200 to launch each of the crosswind power kites based on the size of the kite and the length of the tether attached to the kite; and (2) each of the crosswind power kites to land on based on the size and flight characteristics of the kite while flying like an untethered aircraft. In this illustrated example embodiment, the present disclosure includes one or more taxiways such as taxiway 104 that extends from the surface 103 of the runway 100 toward or to the shared power generation site where the ground anchor assemblies 32, 34, 36, 28, and 40 are located. In this example embodiment, the fleet-shared runway 100 is conveniently located in an area accessible by surface vehicle and adjacent to the area of electric power generation site where the ground anchor assemblies 32, 34, 36, 38, and 40 are located such that the surface vehicle 200 can quickly transport the lower end of the tether of each launched crosswind power kite to a designated one of the ground anchor assemblies 32, 34, 36, 38 and 40.

In the illustrated example embodiment of FIGS. 1, 2A, 3, 4, and 5, the launch and transport vehicle 200 is suitably powered to individually launch each crosswind power kite and to individually transport the lower end of the tether of each launched crosswind power kite to the respective ground anchor assembly. The launch and transport vehicle 200 is in various embodiments thus configured to provide propulsion for takeoff and climb of each crosswind power kite, and configured to move a lower end of the tether to a vacant ground anchor assembly for attachment to the ground anchor assembly. In this illustrated example embodiment, the launch and transport vehicle 200 includes: (1) a wheeled ground based vehicle configured to support the payout winch; and (2) appropriate kite monitoring systems (not shown) to enable the driver of the vehicle to monitor the crosswind power kite prior to, during, and after launch. In certain embodiments of the present disclosure, the vehicle is autonomously operated without a human driver or operator.

In the illustrated example embodiment of FIGS. 1, 2A, 3, 4, and 5, electric power can be transmitted from the ground vehicle 200 to the crosswind power kite during tow-launch and during transport of the lower end of the tether. During these operations, data can also be transmitted to and from the crosswind power kite.

Figure 1:
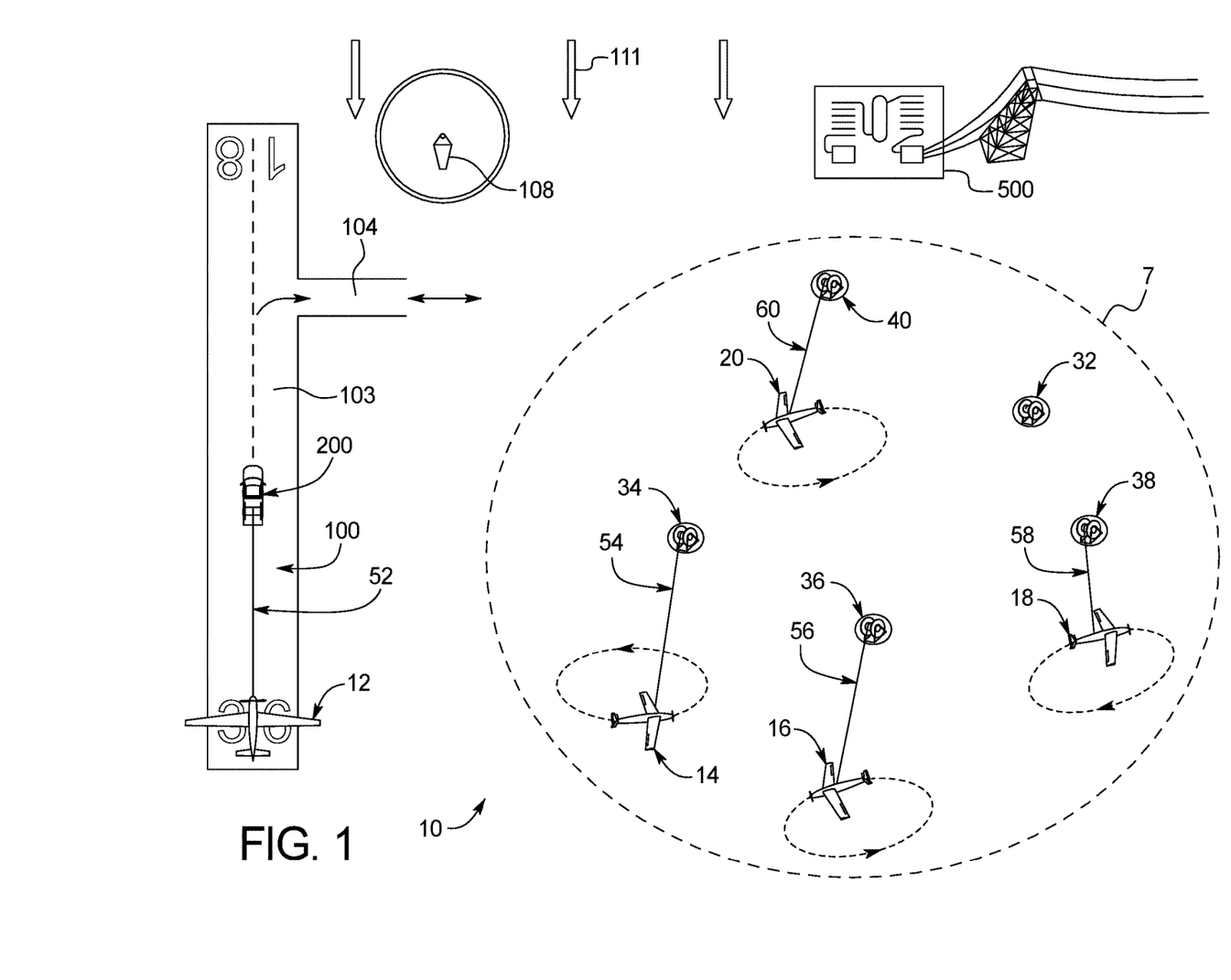
FIG. 1 is a diagrammatic top view of a crosswind power kite system of one example embodiment of the wind harvesting system of the present disclosure that includes a fleet of crosswind power kites wherein each crosswind power kite is configured to be releasably tethered to a ground anchor assembly at a shared electric power generation site, and the entire fleet of crosswind power kites is serviced by a fleet-shared runway and shared launch and transport vehicles.

It should be appreciated from the above that each crosswind power kite of the system such as each of crosswind power kites 12, 14, 16, 18, and 20 is launchable from the fleet shared runway 100. Each launch of each kite (i.e., each launch event) on the fleet shared runway 100 thus makes use of the same launch and transport vehicle 200 and the same payout winch 300.

Figure 2A:
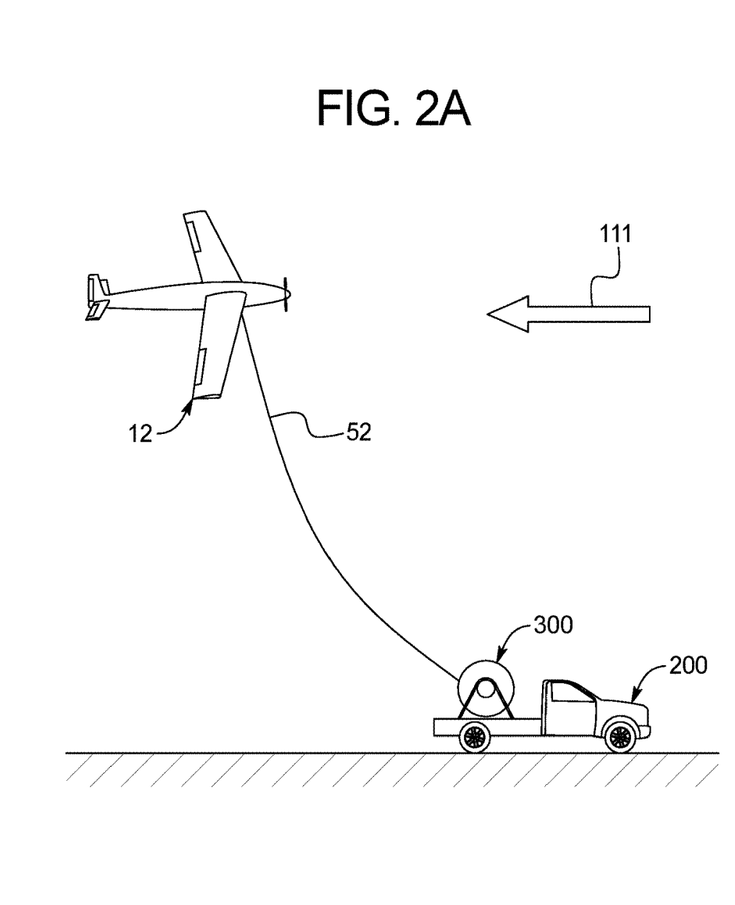
FIG. 2A is a diagrammatic side partial perspective view of a wheeled ground launch and transport vehicle supporting a payout winch in accordance with one example embodiment of the crosswind power kite system of FIG. 1, and of the vehicle tow-launching one of the crosswind power kites in accordance with one example method of the present disclosure.
Figure 3:
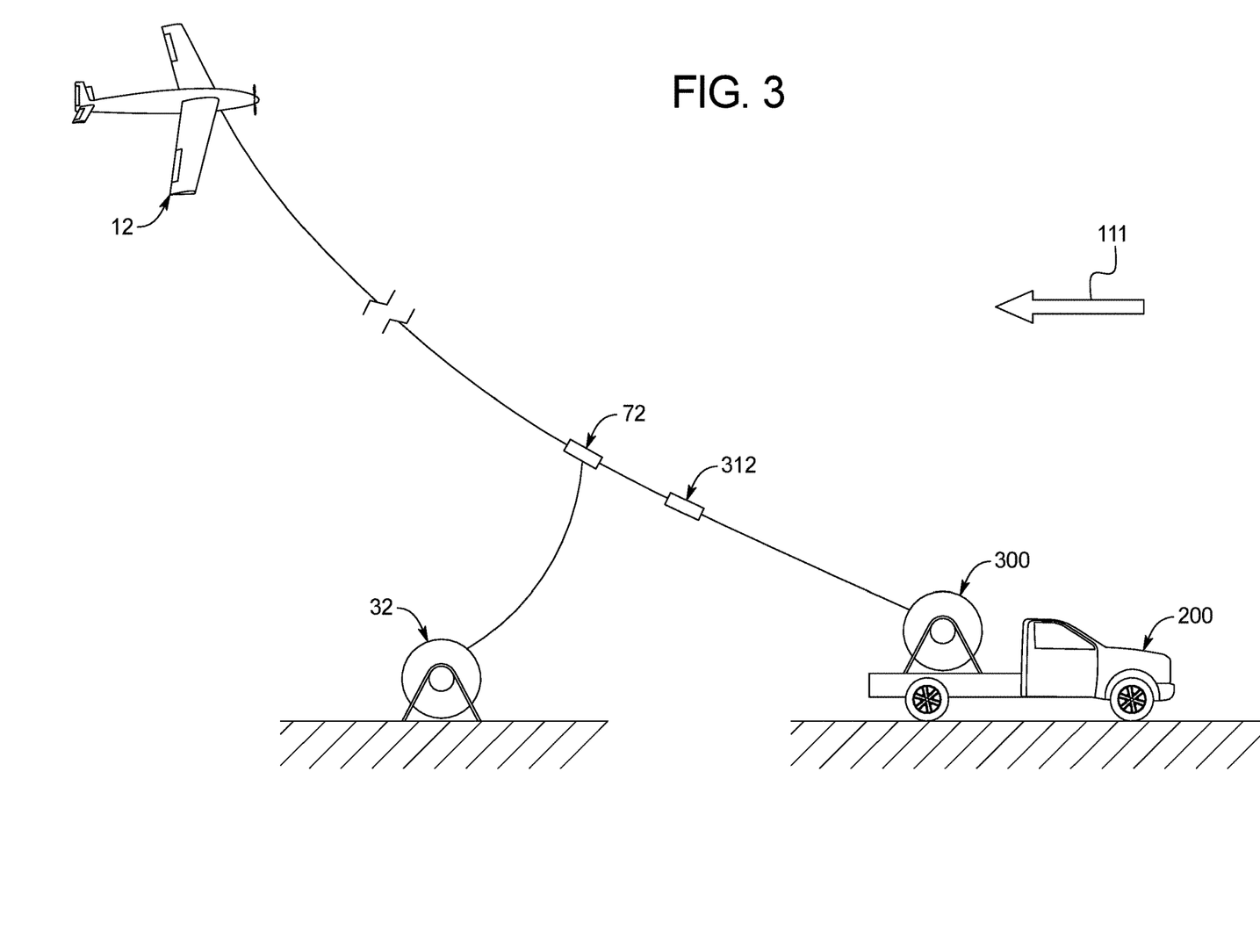
FIG. 3 is a fragmentary diagrammatic side view of a shared launch and transport vehicle delivering a lower end of a tether that is attached to an airborne crosswind power kite to a ground anchor assembly in accordance with the crosswind power kite system of FIG. 1.

One example launching method of the present disclosure is generally illustrated by FIGS. 1, 2A, and 3 and includes: (1) determining that it is desired to launch crosswind power kite 12 based on the conditions of crosswind 111; (2) releaseably attaching a lower end of tether 52 to the payout winch 300 using the elongated member 312 of tether 52; (3) releaseably attaching an upper end of tether 52 to the crosswind power kite 12 using one of the tether-to-kite attachment assemblies; (4) causing the vehicle 200 to launch the crosswind power kite 12 by towing the crosswind power kite 12 to a desired altitude with the tether 52 (optionally) unspooling from an (optional) payout winch 300; (5) after the launch event and after the crosswind power kite 12 begins its flight operation, causing the vehicle 200 to transport the lower end of the tether toward and adjacent to the vacant ground anchor assembly 32 (See FIG. 1); (6) using the tether-to-ground-anchor attachment assembly 72 to attach the lower end of the tether 52 to the previously vacant ground anchor assembly 32; and (7) detaching the lower end of the tether 52 at the elongated member 312 from the payout winch 300 and the vehicle 200. It should thus be appreciated that post-launch of the crosswind power kite 12, the launch and transport vehicle 200 gradually moves the lower end of the tether 52 to the vacant ground anchor assembly 32 within the kite-fleet's shared geographical operating area. After the attachment of the lower end of the tether 52, the crosswind power kite 12 and the ground anchor assembly 32 can then begin electric power generation and transmission. The electric power generated by the crosswind power kite 12 and transmitted to the ground anchor assembly 32 is further transmitted via one or more suitable electric power communication lines (not shown) to the power transmission system 500.

This example launching method of the present disclosure is employed for each of the crosswind power kites that will operate at the power generation site to harvest the wind. When generating electric power, each crosswind power kite 12, 14, 16, 18 and 20 has its own respective tether and its own respective ground anchor assembly at the power generation site as generally shown in FIG. 1 and can thus all simultaneously operate.

Figure 4:
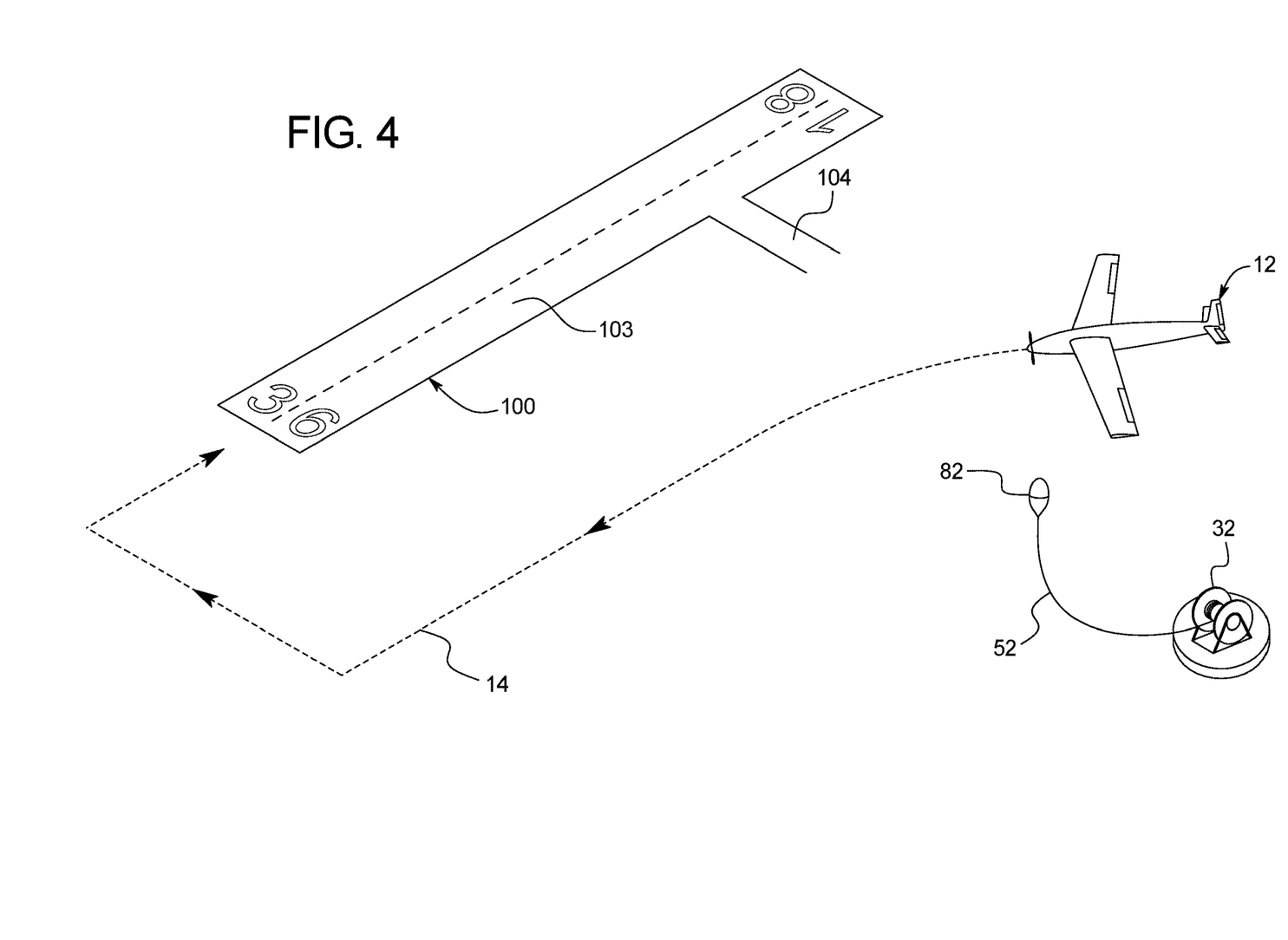
FIG. 4 is a diagrammatic perspective view of an airborne crosswind power kite of the crosswind power kite system of FIG. 1 releasing and dropping the tether attached to the crosswind power kite, and the crosswind power kite flying like a wing-borne aircraft toward the fleet-shared runway.
Figure 5:
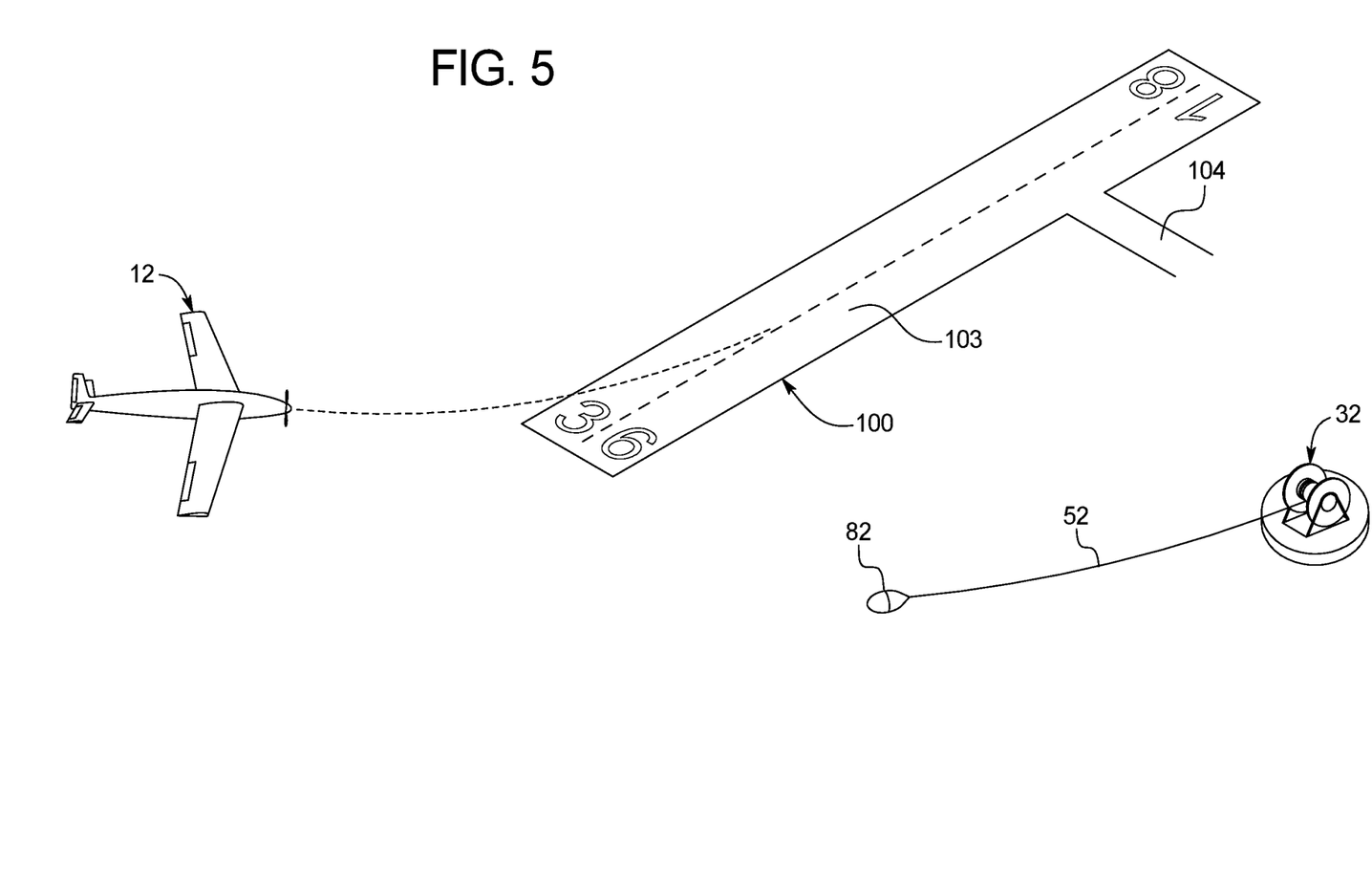
FIG. 5 is a diagrammatic perspective view of an airborne crosswind power kite of the crosswind power kite system of FIG. 1 approaching the fleet-shared runway for landing on the fleet-shared runway.

One example landing method of the present disclosure is generally illustrated by FIGS. 4 and 5 and includes: (1) determining that it is desired to land crosswind power kite 12; (2) causing the tether-to-kite attachment assembly to release or disconnect the upper end of the tether 52 from the crosswind power kite 12 (as shown in FIG. 4); (3) letting the upper end of the tether 52 drop to the ground; (4) causing the ground anchor assembly 32 to recover the tether 52 (or otherwise suitably recovering the tether 52); (5) causing the untethered (or free flying) crosswind power kite 12 to fly like a wing-borne aircraft to the shared runway 100; and (6) causing the crosswind power kite 12 to land on the shared runway 100 as a wing-borne aircraft. This example landing method of the present disclosure is employed for each of the crosswind power kites that will operate at the power generation site to harvest the wind.

It should be appreciated that the present disclosure does not require full automation of every step in the launch and landing processes, and in certain embodiments, human participation or action can be taken to accomplish one or more of the steps of the methods of the present disclosure.

Figure 2B:
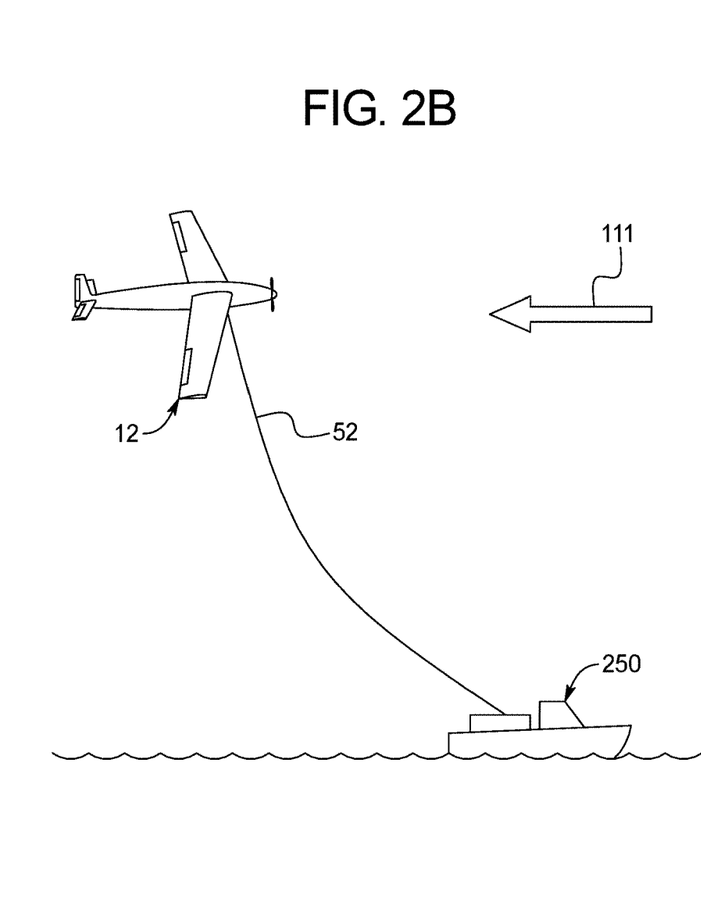
FIG. 2B is a diagrammatic side view partial perspective of a floating launch and transport vehicle supporting a payout winch in accordance with another example embodiment of the crosswind power kite system of FIG. 1, and of the vehicle tow-launching one of the crosswind power kites in accordance with one example method of the present disclosure.

Another example embodiment of the crosswind power kite system of present disclosure is illustrated in FIG. 2B. This illustrated example crosswind power kite system is similar to the crosswind power kite system 10 described above except that the powered surface launch and transport vehicle 250 is a watercraft such as a powered boat (instead of a land based vehicle). Thus, it should be appreciated that various different launching and transport apparatus are usable to launch the fixed wing crosswind power kites of the system from a stationary shared runway or from a body of water in accordance with the present disclosure. It should thus also be appreciated that the powered surface vehicle can be one of a wheeled vehicle, a tracked vehicle, and a boat in various different embodiments of the present disclosure.

Figure 6:
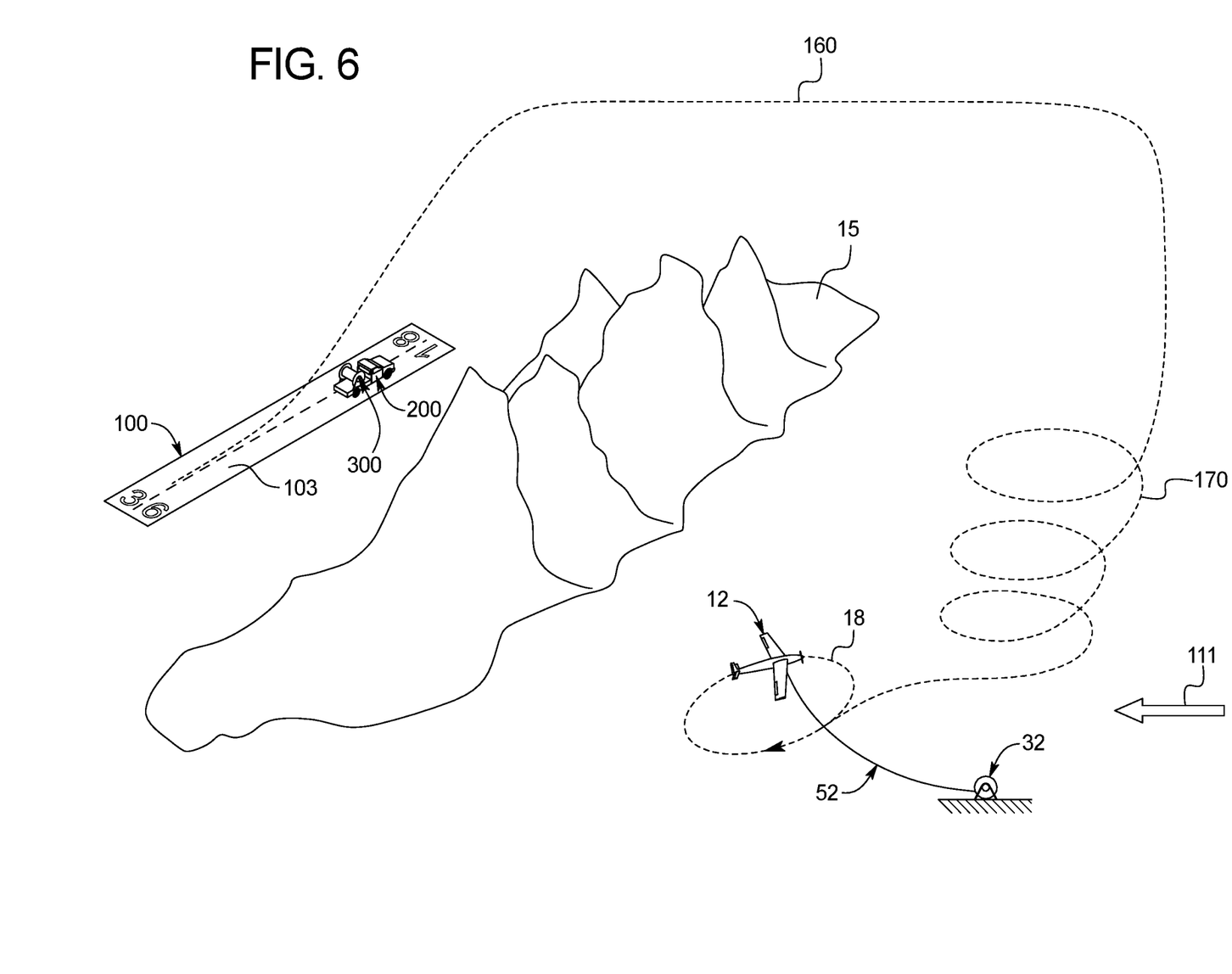
FIG. 6 is a diagrammatic perspective view of an airborne crosswind power kite carrying its own tether from a distant or remote launch/deploy area including a fleet-shared runway to a ground anchor assembly at a power generation site in accordance with another example embodiment of the present disclosure.

Another example embodiment of the crosswind power kite system of present disclosure is illustrated in FIG. 6. In this illustrated example embodiment, the runway 100 is too remote from the electric power generation site to be readily accessible to transport by a ground vehicle between the runway and the electric power generation site because of mountain range 15 for example. In this illustrated example embodiment, the crosswind power kite 12 is launched by a launch and transport vehicle 200 that is attached to and supports a payout winch 300. After launch, the lower end of the tether 52 is detached from the winch 300. Thereafter, the crosswind power kite 12 carries its own tether 52 from the runway 100 to the electric power generation site along deployment route 160 and particularly to the vacant ground anchor assembly 32. After the crosswind power kite 12 is above the vacant ground anchor assembly 32, the lower end of the tether 52 is releaseably attached to the ground anchor assembly 32 by a tether-to-ground-anchor assembly. In this alternative example embodiment, when it is desired to land the crosswind power kite 12, the tether-to-kite attachment assembly that attaches the upper end of the tether to the crosswind power kite 12 can release the upper end of the tether 52 from the crosswind power kite 12 letting the tether 52 drop to the ground. The ground anchor assembly 32 can recover the tether 52 (or the tether 52 can be otherwise suitably recovered). The untethered (or free flying) crosswind power kite 12 can then fly like a wing-borne aircraft to the shared runway 100 and land on the shared runway 100 as a wing-borne aircraft.

Figure 7:
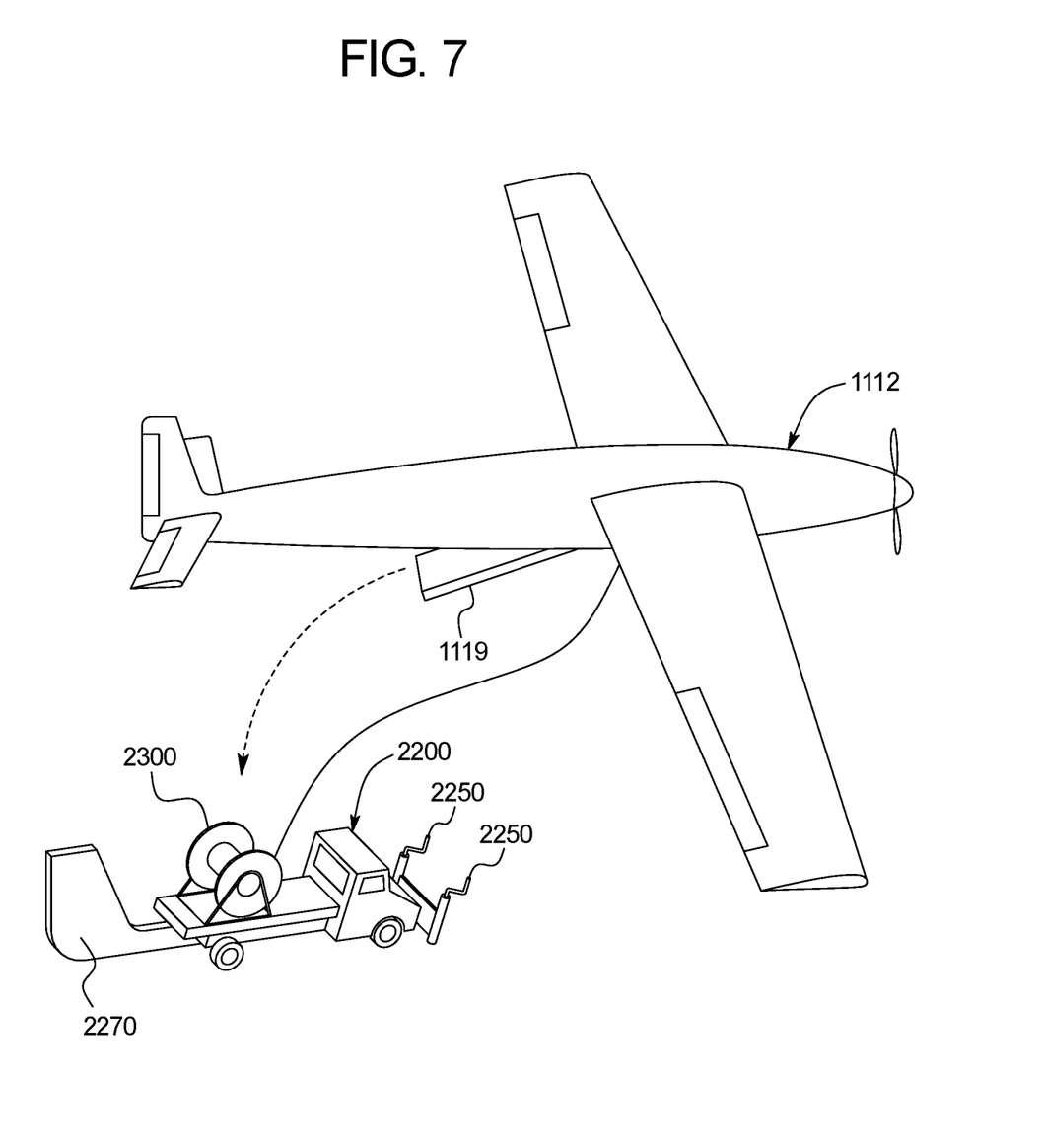
FIG. 7 is an enlarged diagrammatic perspective view of a self-contained crosswind power kite and sling-loadable surface maneuvering vehicle in accordance with another example embodiment of the present disclosure.

Another example embodiment of the crosswind power kite system of present disclosure is illustrated in FIG. 7. This illustrated example embodiment includes a self-contained crosswind power kite 1112 and a surface vehicle 2200 carried by and deployable from the crosswind power kite 1112 via hatch 1119. The illustrated example surface vehicle 2200 of this embodiment may include a payout winch 2300, a fin 2270 to stabilize the surface vehicle 2200 while it is deployed and before it reaches a surface, and one or more surface stabilizing jacks 2250.

This illustrated example crosswind power kite 1112 is configured to be launched from and land on a shared runway. This illustrated example crosswind power kite 1112 carries a deployable tether which can be extended and retracted.

This illustrated example crosswind power kite 1112 thus includes and is configured to carry its own tether to the ground anchor assembly. This illustrated example crosswind power kite 1112, upon arrival at a vacant ground anchor assembly is configured to lower its tether (and in certain embodiments an anchor attached to the tether) to the surface and adjust its flight to function as a crosswind power kite for purposes of wind energy harvesting and electrical power generation at the power generation site.

In the illustrated example embodiment of FIG. 7, each crosswind power kite launches from a remote or distant shared runway and each carries its own tether to the power generation site where wind energy is to be harvested. Each of the crosswind power kite lowers its tether to the surface while orbiting over a fixed-point at the power generation site. The lower end of each tether is attached a ground vehicle which transports the lower end of the tether to a ground anchor assembly to which electrical power will be delivered. Once attached, each of the crosswind power kite adjusts its orbit downwind, tensions the tether, and begins harvesting wind energy.

Various changes and modifications to the presently preferred embodiments described herein will be apparent to those skilled in the art. These changes and modifications can be made without departing from the spirit and scope of the present subject matter and without diminishing its intended advantages. It is intended that such changes and modifications be covered by the appended claims.

The invention claimed is:

1. A wind-harvesting system comprising:
a plurality of crosswind power kites operable at a shared electric power generation site, wherein all of said crosswind power kites are associated with the shared electric power generation site and configured to use:
a stationary shared runway configured for each of the crosswind power kites to launch from the stationary shared runway as a fixed wing aircraft and to land on the stationary shared runway as a fixed wing aircraft; and
a powered surface vehicle operable on the stationary shared runway and configured to: (a) facilitate launching each crosswind power kite from the stationary shared runway; and (b) transport a lower end of a tether associated with each recently-launched crosswind power kite to a ready ground anchor assembly to enable attachment of the tether to the ground anchor assembly;
wherein for each of the crosswind power kites, an upper end of the tether associated with that crosswind power kite is releasably attachable from that crosswind power kite, and that crosswind power kite is configured to release the upper end of that tether before that crosswind power kite lands on the stationary shared runway.

2. The wind-harvesting system of claim 1, wherein for each crosswind power kite, the tether associated with the crosswind power kite is configured to be paid out from a payout winch supported by the powered surface vehicle.

3. The wind-harvesting system of claim 1, wherein for each crosswind power kite, the tether associated with the crosswind power kite is configured to facilitate transmitting electric power through the tether.

4. The wind-harvesting system of claim 3, wherein the powered surface vehicle is configured to transmit electric power through the tether associated with the crosswind power kite to the crosswind power kite during launching of the crosswind power kite from the shared runway and during the transport of the lower end of the tether associated with the recently-launched crosswind power kite to the ground anchor assembly.

5. The wind-harvesting system of claim 1, wherein for each crosswind power kite, the tether associated with the crosswind power kite is configured to facilitate transmitting data through the tether.

6. The wind-harvesting system of claim 5, wherein the powered surface vehicle is configured to transmit data through the tether associated with the crosswind power kite to the crosswind power kite during launching of the crosswind power kite from the shared runway and during the transport of the lower end of the tether associated with the recently-launched crosswind power kite to the ground anchor assembly.

7. The wind-harvesting system of claim 1, wherein each crosswind power kite has one or more onboard motor/rotor assemblies configured to propel the crosswind power kite for: (i) launch, (ii) transition to and from a power generating orbit, and (iii) when a wind lull occurs.

8. The wind-harvesting system of claim 1, wherein each crosswind power kite has an onboard generator or motor/rotor assembly configured to generate electricity.

9. The wind-harvesting system of claim 1, wherein for each crosswind power kite, the ground anchor assembly associated with the crosswind power kite is configured to generate electrical power by lengthening and shortening the tether associated with crosswind power kite.

10. The wind-harvesting system of claim 1, wherein the crosswind power kite is configured to release the upper end of the tether before the crosswind power kite begins travel toward the shared runway to land.

11. A self-contained wind harvesting system comprising:
a crosswind power kite configured to take-off from and land on a stationary shared runway as a fixed-wing aircraft;
a deployable tether, wherein an upper end of the tether is releasably attachable to the crosswind power kite; and
a powered surface vehicle releasably attachable to a lower end of the tether, wherein the powered surface vehicle is configured to move the lower end of the tether of the crosswind power kite, when airborne, to a ground anchor assembly to enable attachment of the lower end of the tether to the ground anchor assembly when the crosswind power kite is airborne.

12. The self-contained wind harvesting system of claim 11, wherein the powered surface vehicle is configured to be suspended above a surface by the deployed tether from the crosswind power kite, when airborne.

13. The self-contained wind harvesting system of claim 11, wherein the powered surface vehicle is a land vehicle.

14. The self-contained wind harvesting system of claim 11, wherein the powered surface vehicle is releasably attachable to a body of the crosswind power kite.

15. The self-contained wind harvesting system of claim 11, wherein the powered surface vehicle includes one or more jacks configured to facilitate stabilization and/or leveling of the powered surface vehicle on a surface when the powered surface vehicle is deployed from the crosswind power kite.

16. The self-contained wind harvesting system of claim 11, wherein the powered surface vehicle includes one or more fins configured to facilitate stabilization of the powered surface vehicle when the powered surface vehicle is suspended by a tether from the airborne crosswind power kite.

17. The self-contained wind harvesting system of claim 11, wherein the tether is configured to facilitate transmitting electric power through the tether.

18. The self-contained wind harvesting system of claim 17, wherein the crosswind power kite is configured to facilitate transmitting electric power through the tether to the powered surface vehicle while the powered surface vehicle transports the tether to the ground anchor assembly.

19. A wind-harvesting system comprising:
a stationary shared runway;
a stationary shared electric power generation site;
a plurality of separate crosswind power kites, each crosswind power kite configured to launch from the stationary shared runway and to land on the stationary shared runway as a fixed-wing aircraft, each of the crosswind power kites operable at the stationary shared electric power generation site; and
a plurality of separate tethers, each separate tether associated with a separate use by one of the crosswind power kites, each tether associated with one of the crosswind power kites being releasably attachable from that crosswind power kite before that crosswind power kite lands on the stationary shared runway.

20. The wind-harvesting system of claim 19, which includes a powered land surface vehicle operable at the stationary shared runway and configured to facilitate launching of each crosswind power kite from the stationary shared runway.

* * * * *